Patented Aug. 30, 1927.

1,640,668

UNITED STATES PATENT OFFICE.

EUGÈNE ALBERT PRUDHOMME, OF NEUILLY-SUR-SEINE, FRANCE, ASSIGNOR TO SOCIÉTÉ INTERNATIONALE DES PROCÉDÉS PRUDHOMME, OF PARIS, FRANCE.

PROCESS FOR THE REGENERATION OF METAL CATALYSTS CONTAMINATED BY SULPHUR.

No Drawing. Original application filed January 20, 1925, Serial No. 3,655, and in France May 19, 1924. Divided and this application filed May 8, 1926. Serial No. 107,833.

This application is a division of my copending application Serial No. 3 655, filed January 20, 1925, and entitled "Manufacture of carbureting liquids similar to petrol."

The subject of the present invention is a process for the regeneration of metal catalysts contaminated by sulphur. the process being particularly applicable in the case wherein metal or oxymetallic catalysts are employed in a plant for the manufacture of light synthetic hydrocarbons by decomposition of carbonaceous materials of low value.

The chief result from the industrial point of view, and which the new process permits to be obtained is to render possible complete regeneration without it being necessary to manipulate the catalytic agents, these latter being able to remain intact within the actual apparatuses in which they have served as catalysts, and the entire plant being maintained in its normal functional state, the treatment requiring, in fact, merely the manipulation of several cocks.

According to the invention, the contaminated catalysts are subjected, in the dry state, to the action of a stream of organic acid vapour, such as acetic acid, or formic acid, for example, this being effected at a temperature which permits the formation of corresponding organic salts, with the expulsion of the sulphuretted hydrogen derived from the sulphides.

When the disengagement of sulphuretted hydrogen has ceased, the temperature, within the catalyzing apparatuses which, during this operation, has been maintained sufficiently low, at 100° C. for example, is increased afresh to about 150° C. At this temperature the organic salts (acetates, formates. or the like) decompose; the organic acid disengages itself in the state of vapour, and can be collected to a large extent and condensed outside, whilst the catalyst is regenerated whilst remaining in situ, to the solid and dry state, during the entire duration of the regeneration treatment.

I claim:

1. A process of regenerating sulphur-contaminated catalysts which consists in eliminating the sulphur therefrom in the form of sulphuretted hydrogen by combining said catalysts with an organic acid.

2. A process for regenerating sulphur-contaminated catalysts which consists in treating sulphides contained thereby with organic acid vapor to form organic acid salts and sulphuretted hydrogen and eliminating the latter.

3. A process of regenerating sulphur-contaminated catalysts which consists in treating the sulphides contained thereby with organic acid vapor to form organic acid salts and sulphuretted hydrogen and eliminating the latter, and in subsequently decomposing said salts.

4. A process of regenerating sulphur-contaminated catalysts which consists in treating said catalyst with organic acid at a temperature of about 100° C. to combine with the sulphides and liberate sulphuretted hydrogen, and subsequently decomposing the organic acid salts thus formed.

5. A process of regenerating sulphur-contaminated catalysts which consists in treating said catalyst in a dry state with organic acid vapor at a temperature of approximately 100° C., eliminating the sulphuretted hydrogen thereby formed, and decomposing the remaining organic salts by heat at a temperature of approximately 150° C.

6. A process of regenerating sulphur-contaminated catalysts which consists in treating said catalyst in a dry state with organic acid vapor at a temperature of approximately 100° C., eliminating the sulphuretted hydrgen thereby formed, decomposing the organic salts thereby formed by heating to a temperature of approximately 150° C., and recovering the liberated acid.

In testimony whereof I affix my signature.

EUGÈNE ALBERT PRUDHOMME.